United States Patent [19]
Schutz et al.

[11] 3,761,853
[45] Sept. 25, 1973

[54] MECHANICALLY VARIABLE MODULAR HIGH REACTIVITY POWER INDUCTOR FOR HIGH A. C. VOLTAGE RESONANT TESTING OF CAPACITIVE LOADS

[75] Inventors: Richard F. Schutz; Stanley G. Peschel, both of Brewster, N.Y.

[73] Assignee: Hipotronics, Inc., Brewster, N.Y.

[22] Filed: Nov. 13, 1972

[21] Appl. No.: 305,867

[52] U.S. Cl............... 336/58, 336/84, 336/131, 336/134, 336/180
[51] Int. Cl. ............................................. H01f 21/06
[58] Field of Search................ 336/58, 84, 131, 336/134, 180, 130

[56] References Cited
UNITED STATES PATENTS

| | | | |
|---|---|---|---|
| 2,840,789 | 6/1958 | Miller | 336/134 |
| 2,591,582 | 4/1952 | Monette | 336/134 X |
| 1,680,910 | 8/1928 | Pfiffner | 336/134 X |
| 1,008,270 | 11/1911 | Jacobi et al. | 336/134 |
| 3,515,986 | 6/1970 | Peschel | 336/134 |
| 3,609,614 | 9/1971 | Schutz | 336/134 |
| 3,703,692 | 11/1972 | Peschel | 336/134 |

*Primary Examiner*—Thomas J. Kozma
*Attorney*—Roland T. Bryan et al.

[57] ABSTRACT

A mechanically variable high reactivity power inductor is described for high A.C. voltage testing capacitive loads, such as high voltage electrical power transmission cables, large capacitors, or groups of capacitors, and transmission and generation equipment.

23 Claims, 11 Drawing Figures

Patented Sept. 25, 1973

MECHANICALLY VARIABLE MODULAR HIGH REACTIVITY POWER INDUCTOR FOR HIGH A.C. VOLTAGE RESONANT TESTING OF CAPACITIVE LOADS

The modular inductor is formed of a cascaded plurality of vertically stacked inductor modules electrically connected in series, each inductor module carrying a portion of the total A.C. voltage across the inductor, and thus distributing the high voltage potential along its vertical height. Each separate module is formed of an oval enclosure containing dielectric fluid with a magnetic core supported therein in a vertical plane and having horizontally separable core segments providing upper and lower gaps. One core segment is stationary and the other core segment is horizontally moved by feed screws horizontally mounted in the core segments to control the size of the gaps and to withstand the attractive forces between the core segments. Upper and lower electrical windings bridge the gaps between the core segments to control fringing. The windings have their inner ends connected to the magnetic core to lessen field strengths and dielectric requirements between respective windings and core. Ganged driving means extending vertically along the side of the inductor drive the feed screws in each module for synchronous movement thereof simultaneously to control the gap size in all of the modules.

BACKGROUND OF THE INVENTION

1. Field of the Invention

This invention relates to the field of high voltage alternating current (A.C.) testing and more particularly to mechanically variable high reactivity power inductors for testing capacitive loads, such as high voltage electrical power transmission cables, large capacitors or groups of capacitors, and transmission and generation equipment.

One method for alternating current testing of capacitive loads such as long lengths of high voltage electrical power transmission cables, described in U.S. Pat. No. 3,515,986, employs an inductor connected so that its inductance can be resonated at the desired A.C. frequency with the capacitance of the load being tested. With the exciting voltage at a low level, the inductance is mechanically varied until a resonant condition is established. The exciting voltage is then increased to a level where the capacitive load is subjected to the desired high A.C. testing voltage. The use of a resonant network for A.C. testing of capacitive loads such as electrical cables advantageously reduces the magnitude of the exciting voltage, reduces the kilovolt-ampere (KVA) requirements to be drawn from the electrical supply source, and reduces equipment damage should the tested load fail during the test. Cable breakdown, due to a short circuit at an intermediate location, immediately detunes the resonant circuit and thus correspondingly abruptly reduces the A.C. testing voltage so that damage is automatically minimized.

Resonant circuit testing as described above is a convenient means for producing high voltages, but demands a special variable inductor which must have an enormous reactive power capability and which can withstand very high A.C. voltage stresses as well as being variable over a wide effective range of inductance values. At resonance, the variable inductor carries a very large A.C. voltage, which creates large electric field strengths which create problems for reliable operation. At resonance, the mechanical stresses in the inductor are quite high, and are increased considerably as the exciting voltage is increased after resonance is obtained. These high electrical and mechanical stresses must be withstood reliably so as to provide the advantages of resonant testing.

2. Description of the Prior Art

U.S. Pat. Nos. 3,515,986 and 3,609,614 and U.S. Pat. application Ser. No. 195,485 of Stanley G. Peschel describe mechanically variable power inductors useful and advantageous for high voltage A.C. testing of capacitive loads such as those mentioned above.

SUMMARY OF THE INVENTION

Among the advantages of the present invention are that it provides a mechanically variable high reactivity power inductor for A.C. testing of capacitive loads which inductor is capable of handling large power and very high A.C. voltage conditions, which maintains accurate mechanical control, which is modular in construction so that high voltage units of various sizes and voltage rating for different testing requirements can readily be assembled by stacking and interconnecting of the modules.

Other advantages of the present invention are that very high A.C. voltage stresses can be withstood, and the effective inductance of the inductor can be varied over a wide range by simultaneously adjusting the multiple modules which are electrically connected in series.

A further advantage flowing from the present invention is that a high A.C. voltage can be obtained without incurring undue electrical or mechanical stresses. Each module carries a portion of the total voltage stress which is distributed along the vertical height of the stacked modules.

In accordance with the invention, the power inductor is formed of a cascaded plurality of vertically stacked inductor modules electrically connected in series, each of the inductor modules carrying a portion of the total A.C. voltage across the inductor so as to distribute the high voltage potential along the length of the inductor and thereby reduce the electric field strength associated with each module. Each of the inductor modules comprises an enclosure, preferably elongate and containing dielectric fluid, with a magnetic core supported in a vertical plane in the enclosure and having horizontally separable core segments providing upper and lower gaps. One core segment is stationary and the other core segment is moved by feed screws, preferably mounted internally of the core segments and coupling both core segments across the gaps therebetween, which produce horizontal movement of the movable core segment to control gap size and inductance. Upper and lower electrical windings bridge the upper and lower gaps between the core segments to reduce fringing variations as the exciting voltage is changed. The cascaded power inductor has means for electrically connecting adjacent module windings, the windings of each module preferably having their inner ends connected to the magnetic core itself to lower the field strengths between the windings and core. Ganged driving means extending vertically along the side of the inductor drive the individual horizontal feed screws synchronously to rotate them and simultaneously control gap spacing in each of the inductor modules.

The foregoing stackable modular inductor structure provides improved potential distribution in the inductor to avoid costly dielectric assemblies, improved mechanical and electrical stability of the inductor as exciting voltages are changed, improved economy and simplicity of production of power inductors, and therefore improved reliability, accuracy, and marketability of high voltage test equipment with which the inductor is used for testing high voltage electrical power transmission cables and other capacitive loads.

These and other advantages of the invention may be understood from the following description of an inductor in accordance with the invention which is described in conjunction with the following drawings.

DESCRIPTION OF THE PREFERRED EMBODIMENT

Figure 1:
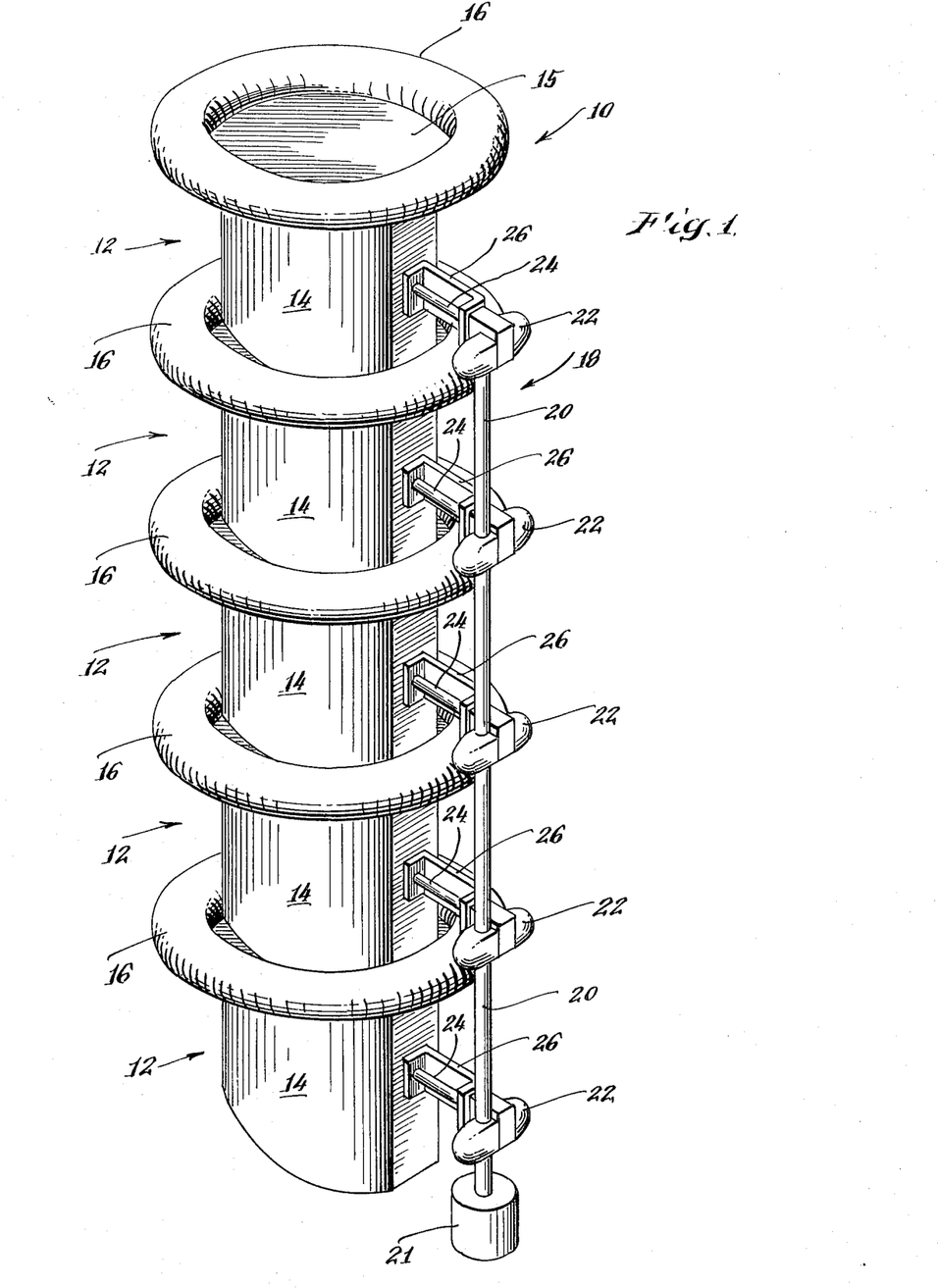
FIG. 1 is a perspective view of a variable inductor in accordance with the invention illustrating the vertical stacking of inductor modules with ganged drive means extending vertically to form a single cascaded mechanically variable power inductor.

FIG. 1 illustrates a variable inductor 10 constructed according to the invention for high A.C. voltage testing of capacitive loads, such as high voltage electrical power transmission cables, large capacitors and transmissions and generation equipment. The inductor 10 is formed of a plurality of vertically stacked inductor modules 12, the number of inductor modules being selected to obtain the desired very high A.C. voltage capacity and sufficient inductance and power capacity for testing a desired capacitive load. Each inductor module 12 has an outer insulating enclosure 14, constructed, for example, of resin impregnated glass fiber cloth with a conductive metal cover 15 surrounded by an upper toroidal corona ring 16. The stacked inductor modules 12 have their inductances simultaneously mechanically varied by means of a ganged drive 18 extending vertically along the side of the inductor 10. This ganged drive 18 comprises a vertical rotary shaft 20 made of a strong, rigid insulating material, such as "Permalite," turned by a control motor 21 at the bottom and coupled through individual gear boxes 22 to the individual horizontal drive shafts 24 supported by brackets 26 and extending into the respective module enclosures 14.

Within the enclosures 14, each inductor module 12 has a stationary core segment 30 (FIGS. 2 and 3) and a movable core segment 32 which are horizontally separable to form an upper gap 34 and a lower gap 36. Each core segment is U-shaped defining a pair of legs 30-1, 30-2, and 32-1, 32-2 with the gaps 34 and 36 being between the ends of these legs. Together the core segments form a rectangular magnetic core disposed in a vertical plane within the enclosure 14. Upper and lower electrical windings 38 and 40 are wrapped around the legs 30-1 and 32-1, and 30-2 and 32-2, respectively, bridging the gaps 34 and 36 so as to confine flux to the gaps and prevent troublesome variations in fringing of flux as the exciting voltage is increased. As shown in FIG. 3, the legs 32-1 and 32-2 of the movable core segment are longer than the legs 30-1 and 30-2 of the stationary core so that the ends of the legs 30-1 and 30-2 of the stationary core segment lie a distance $d$ toward the ends $e$ of the windings from the plane of the winding centers $c$. The distance of the offset $d$ is in the range from ¼ to ½ of the distance from the plane of the winding center $c$ to the winding end $e$, in a typical embodiment, where each inductor module 12 is rated for 200 KVA.

By offsetting the ends of the stationary core legs 30-1 and 30-2 from the centers of the windings 38 and 40 in this fashion, the windings are able more effectively to couple with movable core segment 32 when it is separated horizontally from stationary core segment 30 by large spacing of the gaps 34 and 36.

Figures 2, 8, 9:
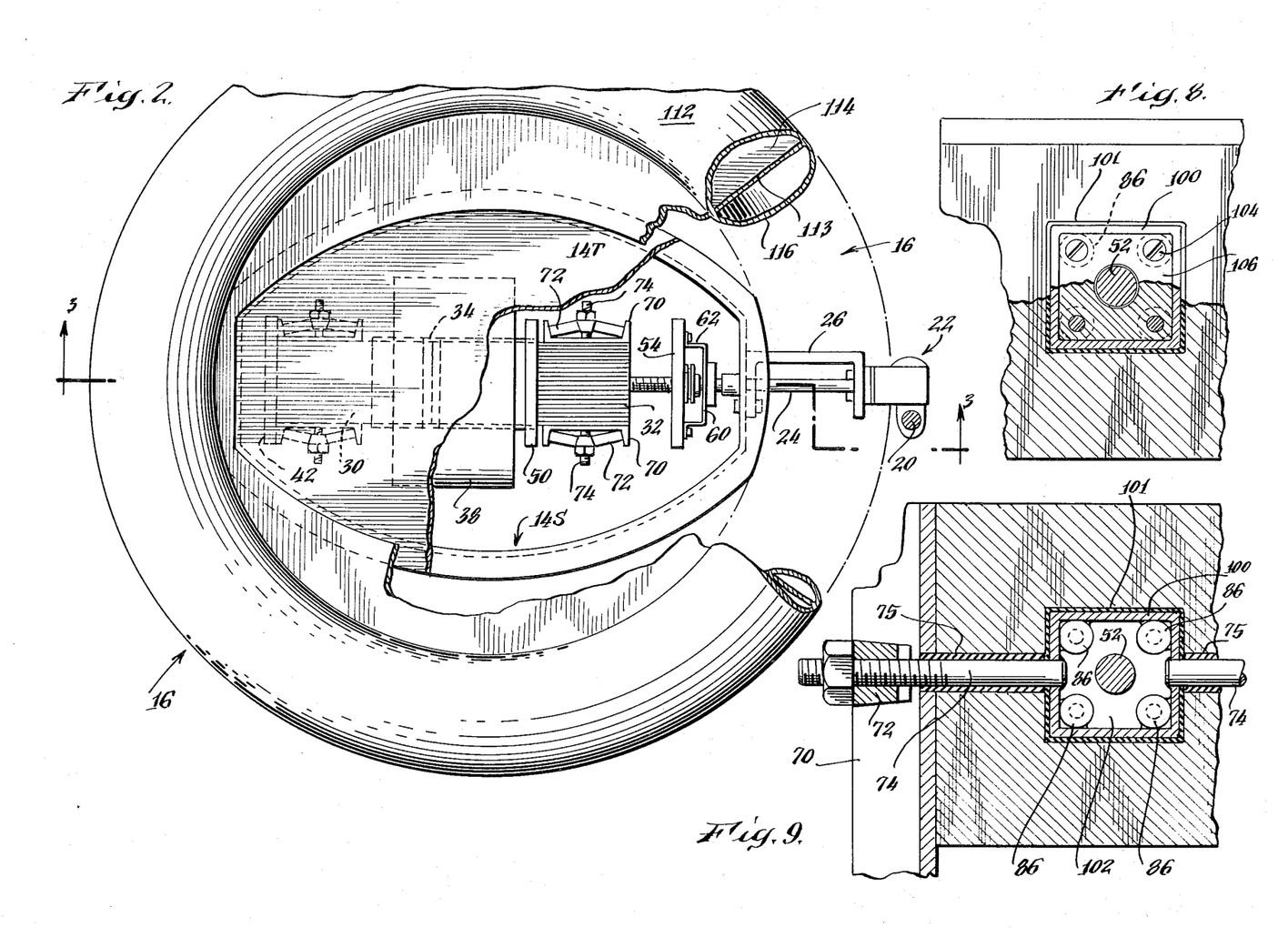
FIG. 2 is a plan view, shown on enlarged scale, with portions broken away and in section, of the variable inductor of FIG. 1.
FIG. 8 is a section taken on line 8—8 of FIG. 6, shown on enlarged scale.
FIG. 9 is a section taken on line 9—9 of FIG. 6, shown on enlarged scale.
Figure 3:
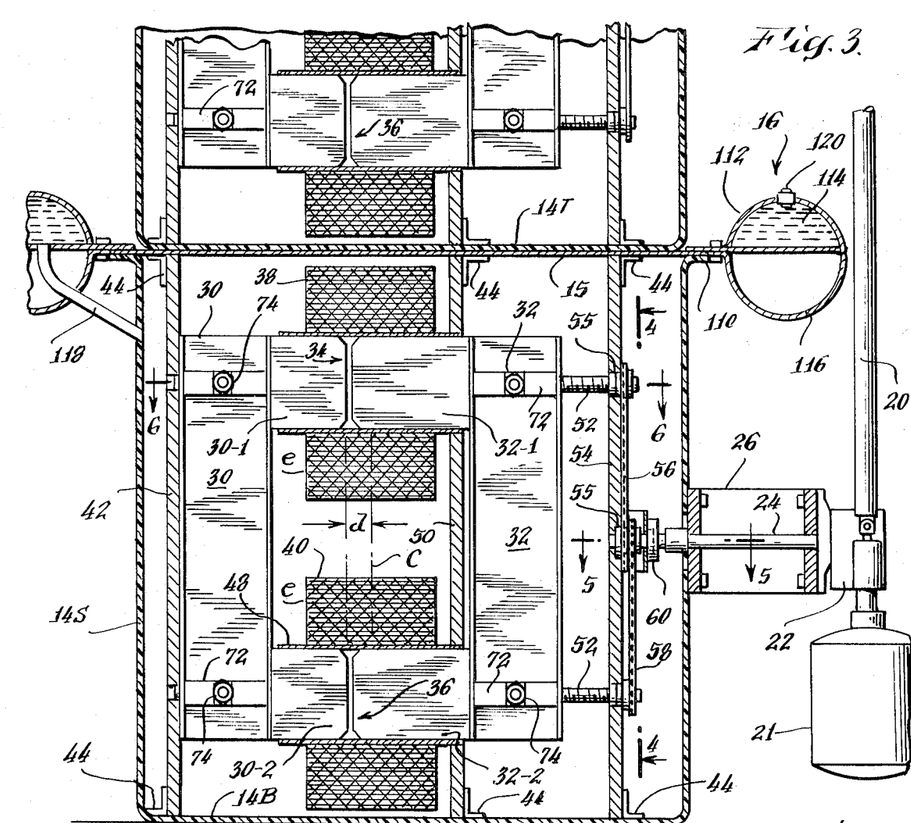
FIG. 3 is a partial elevational section taken along line 3—3 of FIG. 2.
Figure 6:
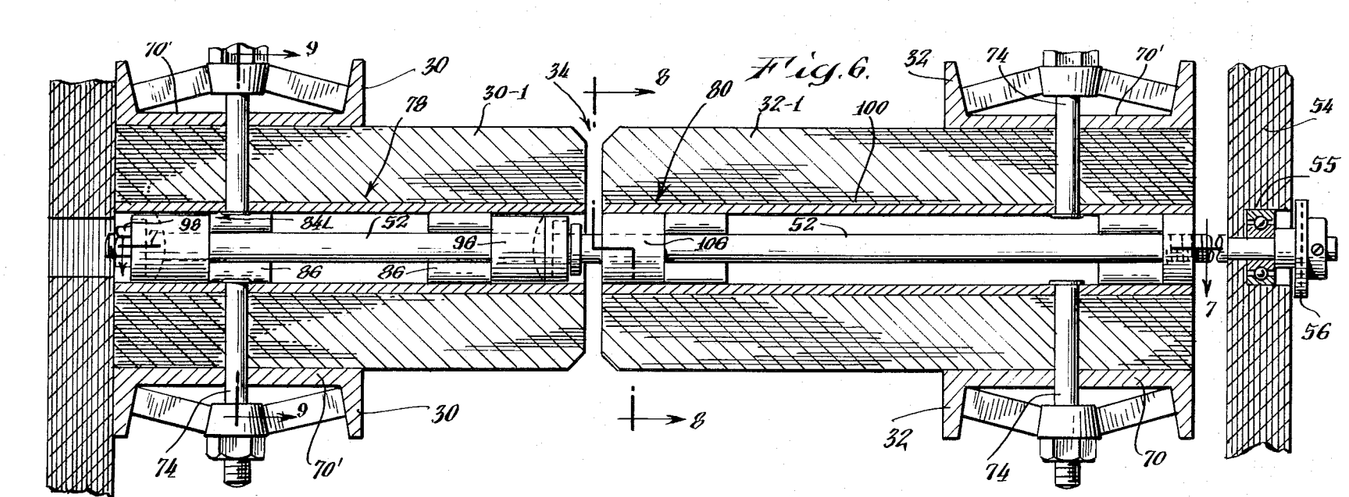
FIG. 6 is an enlarged section illustrating the apparatus for moving the core segments and taken on line 6—6 of FIG. 3.
Figure 7:
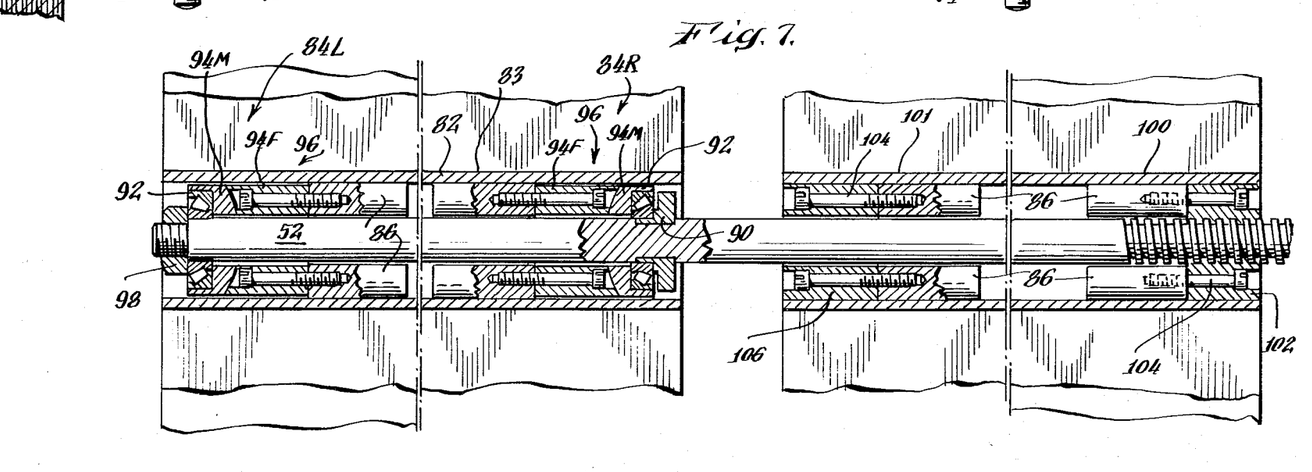
FIG. 7 is a section taken on line 7—7 of FIG. 6, shown with an enlarged scale and with portions removed for clarity.

As shown in FIGS. 2 and 3, stationary core segment 30 is supported within enclosure 14 by a vertical rectangular frame 42 made of strong, rigid, insulating and non-magnetic material as is available commercially as "Permalite," which is a polyester-impregnated dense hardwood plywood, fastened to the cover 15 and bottom wall 14B of the enclosure 14 by angle brackets 44. The electrical windings 38 and 40 are supported on rectangular sleeves 46 and 48, made for example of "Actoglass," a rigid epoxy-impregnated glass composition. These sleeves closely fit over the core segments 30 and 32 and are supported within enclosure 14 by another vertical frame 50 of rigid insulating material, made for example of polyvinyl chloride, and also attached to the enclosure's top and bottom walls by angle brackets 44. There is sufficient clearance within the sleeves 46 and 48 to permit the movable legs 32-1 and 32-2 to be slid in and out by the feedscrews, as will be explained further below. Movable core segment 32 is supported by feed screws 52 which engage within the movable core segment 32, and, upon rotation, produce horizontal movement of the movable core segment to control the size of gaps 34 and 36. Feed screws 52, as will be described in greater detail in connection with FIGS. 6 and 7, are coupled at one end to stationary core segment 30, and as shown in FIGS. 3 and 6, are supported at their other end in enclosure 14 by bearings 55 secured to a third vertical frame 54, of strong, rigid insulating non-magnetic material also for example of Permalite and fastened to the enclosure's top 15 and bottom wall 14B with angle brackets 44. These feed screws are made of strong, non-magnetic material of low electrical conductivity, e.g. non-magnetic stainless steel.

Figure 4:
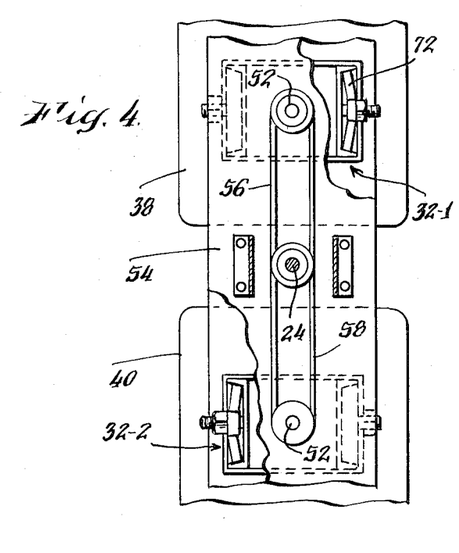
FIG. 4 is a partial elevational section taken along line 4—4 of FIG. 3.
Figure 5:
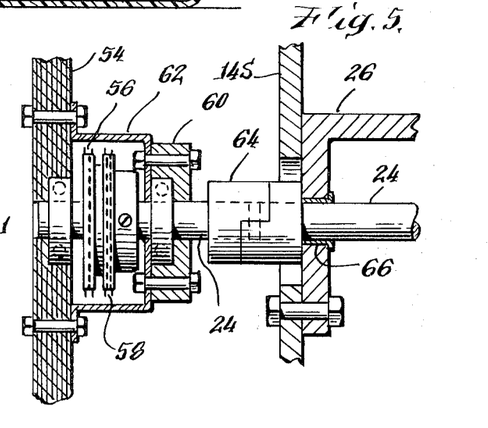
FIG. 5 is an enlarged partial sectional view taken on line 5—5 of FIG. 3.

As shown in FIGS. 3, 4 and 5, feed screws 52 are rotatably coupled to their drive shaft 24 through a chain linkage in which chains 56 and 58 engage sprockets fixed respectively to the feed screws and to the shaft 24. Within enclosure 14, shaft 24 is rotatably mounted by means of a bearing 60 (FIGS. 3 and 5) on a bracket 62 affixed to the vertical frame 54. A jaw coupling 64 (FIG. 5) joins interior and exterior portions of shaft 24, and liquid sealing means 66 is provided where shaft 24 exits from enclosure 14.

Feed screws 52 are rotatably coupled to stationary core segment 30, and are threadably coupled to movable core segment 32, by means of the apparatus illustrated in FIGS. 6 through 9, which is arranged also to impose upon the feed screws, as an axial compressive load, the electromagnetic attractive forces developed between the legs of the core segments. This arrangement accurately maintains adjusted gap size even though tremendous mechanical stresses are created. As shown in FIGS. 2, 3 and 4, core segments 30 and 32 are formed of thin laminations compressed together by structural channels 70 and 70' used in pairs to clamp the laminations between them, with V-shaped clamps 72 being located in the channels interconnected with large clamping studs 74 which are internally secured as shown in FIG. 9.

Within core segments 30 and 32 there are formed central horizontal colinear passages 78 and 80 which join across gaps 34 and 36, and which receive the horizontal feed screws 52. Within passage 78 in stationary core segment 30 is a coupling assembly 79 rotatably coupling with feed screw 52 and comprising a tube 82 of rectangular cross section made of strong non-magnetic material of low electrical conductivity, for example, of non-magnetic stainless steel, and encased in an insulating sheath 83 (FIG. 7) made, for example, of epoxyglass. Clamping studs 74, which attach the channels 70 and 70' are encased in insulating sheaths 75 (FIG. 9) and are welded to the tube 82 and therefore this tube 82 is very strongly anchored in stationary core segment 30 so as to prevent longitudinal movement of the tube 82.

Within the sleeve 82 there are secured horizontally separated thrust bearing assemblies 84L and 84R. Thrust bearing assembly 84R comprises as end stops a group of four mounting cylinders 86 (FIGS. 7 and 9), attached within the inside corners of the tube 82 by welds, and a split collar 88 (FIG. 7) secured to feed screw 52 by being seated in a shallow circumferential groove 90 therein. Between collar 88 and mounting cylinders 86 are located a thrust bearing 92 and two spherically contacting members 94M and 94F forming a self-aligning mounting socket 96 for the bearing 92. As shown in FIG. 7, the inner race of the thrust bearing is seated on a flange of the split collar 88, while the outer race is seated within a recess in self-aligning socket member 94M.

Thrust bearing assembly 84L is similar, having mounting cylinders 86, thrust bearing 92, and members 94M, 94F, forming a self-aligning bearing mounting socket 96. Instead of split collar 88, however, a lock nut 98 on the shaft of feed screw 52 axially seats the inner race of thrust bearing 92.

In horizontal passage 80 in movable core segment 32, there is located another rectangular tube 100 also of strong, non-magnetic material of low electrical conductivity for example, of non-magnetic stainless steel, in an insulating sheath 101 of epoxy-glass, and also secured by welding to two clamping studs 74 in insulating sheaths 75 to very strongly attach the tube 100 to the movable core segment 32. Within tube 100 feed screw 52 is supported at two horizontally spaced locations. In one such location, at the outer end of movable core segment 32, feed screw 52 is threadably engaged by a nut member 102, made for example, of brass, and secured with machine screws 104 to a group of four mounting cylinders 86 welded in the interior corners of the tube 100. At the other horizontally spaced location, near gaps 34 or 36, feed screw 52 is supported by a long sleeve bearing 106, made, for example, of Delrin, secured with machine screws 104 to a group of four mounting cylinders 86 welded in the interior corners of tube 100.

Rotation of the feed screws 52 causes the movable core segment 32 to accurately move horizontally to change simultaneously and equally the size of gaps 34 and 36. Because the feed screws are disposed substantially centrally in the separable core segments, and are firmly axially attached thereto, with axial alignment assured by self-aligning bearing mounts 96, the feed screws are capable of accepting as an axial compressive load the large electromagnetic attractive forces developed between the core segments without binding. It should be noted that such accuracy is maintained without the use of large external massive frames and the like. Because the core segments move horizontally, no gravitational load is placed on the feed apparatus, which therefore may be of lighter construction.

As can be seen from FIGS. 2 and 3, core segments 30 and 32, windings 38 and 40, frames 42, 50 and 54, and the associated apparatus for horizontally moving the movable core segment, lie substantially in a vertical plane within enclosure 14. During operation, enclosure 14 contains a dielectric liquid, such as transformer oil, which submerges the magnetic core and windings to serve as a cooling medium and also to damp vibrational noise. In order to minimize the amount of dielectric liquid needed, enclosure 14 is constructed with a side wall 14S, extending between flat cover plate 15 and flat bottom wall 14B, and having an elongate oval cross section (see FIG. 2) closely surrounding and substantially conforming to the shape of the vertically disposed plane of components therewithin. The enclosure 14 illustrated in the drawings has a side wall 14S with a cross-section which is substantially oval with flattened ends, the long axis of the oval coinciding with the vertical plane defined by the magnetic core segments, windings, and feed screw controlling apparatus.

The side wall 14S of enclosure 14 is provided with an upper flange 110 to which the cover 15 is attached. Corona ring 16 is attached to the conductive metal cover 15 in the region of the flange 110. As shown in FIG. 3, the corona ring 16 is formed of an upper annular segment 112 having a bottom partition 113 connecting to enclosure cover 15 and forming an internal reservoir for dielectric liquid and a lower annular segment 116 which joins with upper annular segment 112 to form a toroidal ring of substantially circular cross section. A gravity feed tube 118 (FIG. 3) connects reservoir 114 to the interior of enclosure 14, and a fill plug 120 is provided in the top of upper segment 112. As shown in FIG. 3, bottom partition 113 of reservoir 114 lies entirely above the interior of enclosure 14 and hence reservoir 114 serves as a compensating tank to maintain enclosure 14 filled with dielectric fluid in a very simple and reliable manner, in spite of thermal expansion or contraction. Since reservoir 114 is located within the outwardly extending corona ring 61, it is convenient to add dielectric liquid to the system through the fill port 120.

Figure 10:
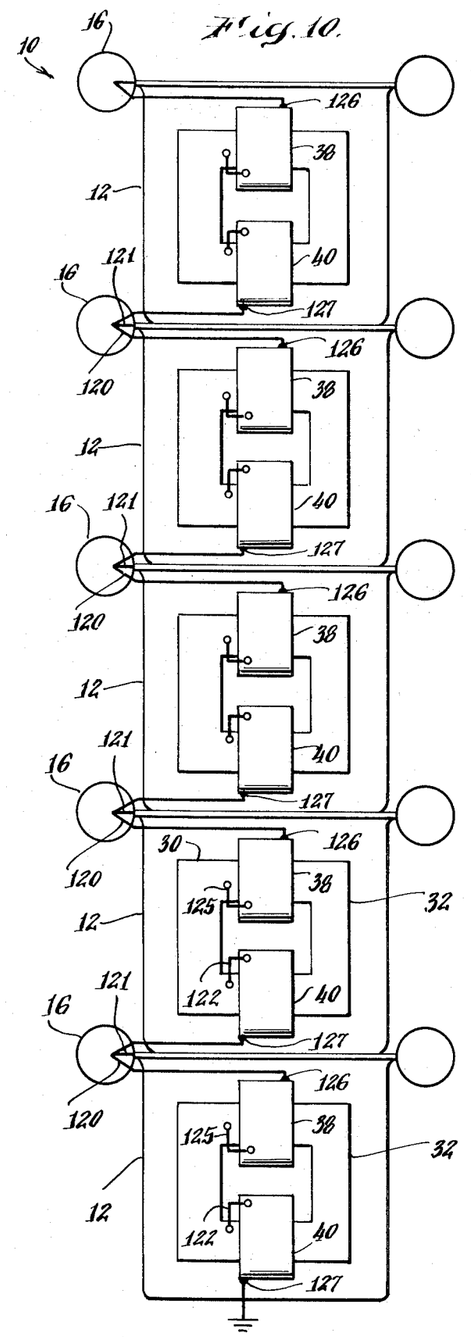
FIG. 10 is a side elevational view of the inductor of FIG. 1, shown in schematic circuit diagram form, illustrating the electrical interconnections of the module windings.
Figure 11:
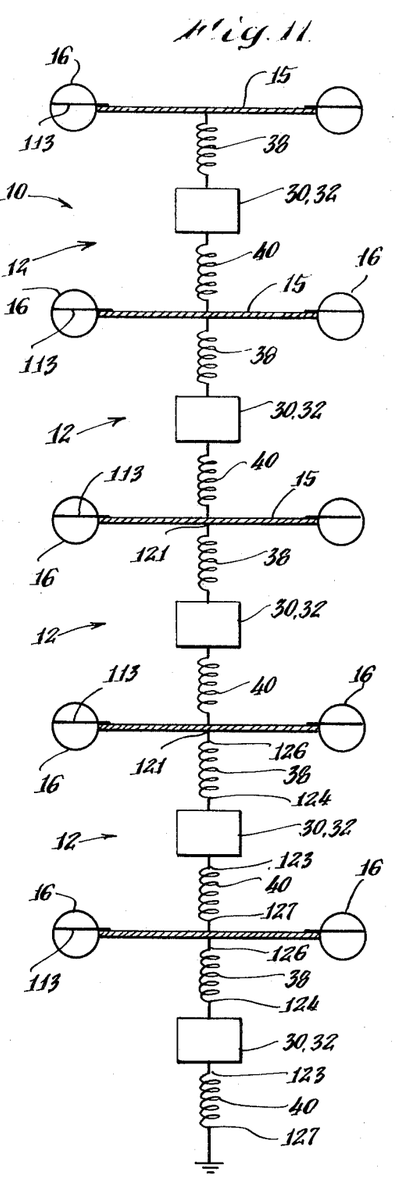
FIG. 11 is a circuit diagram of the electrical components of the inductor in schematic form, illustrating the lengthwise distribution of high A.C. voltage potentials and inductance components within the inductor of FIG. 1.

FIGS. 10 and 11 illustrate the electrical interconnections and characteristics of the inductor 10 according to the invention. As shown in FIG. 10, the stacked inductor modules 12 are provided with connectors 120 which electrically interconnect the upper winding 38 of a module to the lower winding 40 of the module stacked directly above it. The connector 120 also connects the corona ring 16 positioned at the interface between the adjacent modules. Accordingly, the modules are series-connected so that the voltage distribution on inductor 10 is along its vertical height, each module carrying a portion of the total A.C. voltage, and the corona rings 16 having voltages intermediate the outer layers of turns of the respective adjacent windings of the adjacent modules and thus such voltages are also uniformly distributed along the height of the inductor.

The terminal 123 of the inner layer of turns of the lower windings 40 is connected by a lead 122 to the core segments 30 and 32, and the terminal 124 of the inner layer of turns of the upper winding 38 is connected by a lead 125 to the core segments 30 and 32. Thus the upper and lower windings 38 and 40 are connected in series by leads 122 and 125 providing interconnection through the stationary and movable core segments 30 and 32. Accordingly, the magnetic core always lies at the potential existing between windings 38 and 40, and specifically at the potential of the terminals of the innermost layers of the respective windings 38 and 40. Hence the potentials of each of the magnetic cores in stacked inductor 10 are mid-way between the potentials at the terminal 126 and 127 of the outermost layers of the windings 38 and 40. Thus, advantageously the magnetic cores are at potential levels midway between those existing for the terminals 127 near the bottoms of the respective tanks and those existing for the covers 15 and corona rings 16 at the tops of the respective tanks, as will be described further in conjunction with FIG. 11.

Accordingly, the increase in potential occurring along the height of the inductor 10 from bottom to top is uniformly distributed along the height of the inductor. Note that such uniform distribution in potential will occur both at low levels of exciting voltage, when the circuit is being tuned for resonance, and at high levels of exciting voltage during testing automatically and without any adjustment.

Since the magnetic cores in the module 12 lie at the voltage existing between windings 38 and 40 and at those for the innermost layers of turns thereof field strengths within each inductor module 12 are minimized. To further minimize field strengths between the windings and the magnetic core, thereby permitting insulating sleeves 48 to be thin for effective flux coupling across gaps 34 and 36, the windings 38 and 40 are convolutely wound (i.e., with successive layers of the turns of windings proceeding outwardly from the magnetic core). As discussed above, it is the inner ends 123 and 124 of the windings which are connected by the respective connectors 122 and 125 to core segments 30 and 32 so that there is a minimum voltage occurring between the adjacent portions of the magnetic core and windings. The outer ends 126 and 127 of these windings are then attached by connectors 120 to the windings of adjacent inductor modules.

By virtue of the fact that the windings 38 and 40 are supported upon the insulation sleeves 46 and 48 and in turn the ends of these sleeves surrounding the legs 32-1 and 32-2 of the movable core segment are supported by the vertical frame 50, the movable legs 32-1 and 32-2 are free to be moved horizontally by the feed screws 52.

As a result of the connections described above, the electrical circuit provided for inductor 10 is as shown in FIG. 11. Electrical distribution along the vertical height of the inductor is substantially uniform because the modules 12, both individually and collectively when stacked together, present series-connected components which automatically distribute the electrical potential across inductor 10 throughout the length of the inductor. Accordingly, electric field strengths within inductor 10 are limited to levels manageable without expensive or bulky dielectric materials, thus permitting more compact construction. At the same time, the modular series construction of inductor 10 permits a range of inductances and power capacities to be achieved by providing different numbers of modules in a stack. The vertical arrangement of inductor 10 has an additional advantage in that, with its lower end grounded, the highest potentials are substantially elevated and less likely to be hazardous to testing personnel. For example, inductor modules 12 having a 200 KVA capacity (and also a 200 kilovolt rating) have been constructed substantially 4 feet in height, with a four component 800 KVA inductor therefore being 16 feet in height and being capable of handling 800 kilovolts A.C. An additional benefit in the use of vertically stacked inductor 10 is the minimum amount of floor space it occupies.

Although a specific embodiment of the invention has been disclosed herein in detail, it is to be understood that this is for the purpose of illustrating the invention, and should not be construed as necessarily limiting the scope of the invention since it is understood that many changes can be made to the disclosed structures by those skilled in the art to suit particular applications.

We claim:

1. A mechanically variable high reactivity power inductor for A.C. testing of large capacitance loads at high voltage comprising:
    a. a plurality of inductor modules vertically stacked one on top of another to form a stacked inductor;
    b. each module including a container formed of insulating material having a bottom and side walls, said container being adapted to contain dielectric liquid;
    c. a magnetically permeable core structure in each of said containers including a plurality of magnetically permeable core segments;
    d. said core segments being mounted for relative horizontal movement defining at least one gap of horizontally variable spacing;

e. at least one winding within each of said containers surrounding said gap and the adjacent portions of said core segments, whereby the inductance of such winding is varied by varying the gap spacing;

f. means connecting said windings in a series circuit extending along said stack;

g. a horizontal feed screw within each of said containers for relatively horizontally moving said core segments to vary the gap spacing;

h. a drive shaft for each of said feed screws extending horizontally out through the side walls of each of said containers;

i. the drive shafts for the respective containers being located one above the other in said stacked inductor;

j. a common drive member formed of insulation material extending vertically along said stacked inductor and being coupled to each of said drive shafts for rotating them simultaneously; and k. drive means for rotating said common drive member for simultaneously varying the inductance of all of the inductor modules in said stacked inductor.

2. A mechanically variable high reactivity power inductor for A.C. testing as claimed in claim 1, in which:

a. said magnetically permeable core structures each contain two U-shaped core segments having their legs horizontally positioned in end-to-end relationship defining a pair of gaps of which the spacing can be varied and said core segments are positioned in a vertical plane within each container such that one of said gaps is positioned above the other providing an upper and a lower gap, b. an upper and a lower winding are provided in each of said modules respectively surrounding said upper and lower gaps, c. said windings being wound in layers, d. said upper and lower winding having the terminals of their innermost layers electrically connected to said magnetically permeable core structure, e. the upper winding in each module having its terminal of its outermost layer electrically connected to the terminal of the outermost layer of the lower winding in the module located immediately above in the module stack;

f. each of said containers has a cover of electrically conductive material with a corona ring encircling the cover, and g. said terminals of the outermost layers also are electrically connected to the respective corona rings and to the respective electrically conductive covers of the modules in said inductor stack.

3. A mechanically variable high reactivity power inductor for A.C. testing as claimed in claim 2, in which:

a. there are upper and lower feed screws located in each of said modules formed of strong material of low magnetic permeability;

b. said upper and lower feed screws extending horizontally through the centers of the horizontally positioned upper and lower legs of the two U-shaped core segments and extending across the upper and lower gaps;

c. one of said core segments being fixed in positions within the module and the other core segment being mounted for movement toward and away from the fixed segment for varying the gap spacing; and d. upper and lower feed nuts mounted on the movable core segment and respectively engaging the upper and lower feed screws; and e. the drive shaft for each of said modules being coupled to the upper and lower feed screws within the module for producing simultaneous rotation thereof.

4. An accurately mechanically variable high reactivity power inductor for A.C. testing of large capacitance loads at high voltage comprising:

a. a cascaded plurality of vertically stacked inductor modules electrically connected in series, each inductor module carrying a portion of the voltage across the inductor and including:

b. an enclosure adapted to contain dielectric liquid;

c. a magnetically permeable core supported in a vertical plane in the enclosure and being formed of horizontally separable core segments providing upper and lower gaps therebetween, one core segment being stationary and the other core segment being horizontally movable to control the size of the upper and lower gaps;

d. upper and lower electrical windings around the magnetic core and bridging the upper and lower gaps between the core segments; and e. feed screws engaging the movable core segment to produce horizontal movement of the movable core segment to control gap size;

f. said cascaded inductor having means for electrically connecting the upper electrical winding of each module to the lower electrical winding of the module adjacent to and above it, and g. further having ganged driving means along the side of the inductor operatively coupled to the feed screws in each module for synchronous rotation thereof to simultaneously control the gap spacing in each of the modules to vary the inductance of the power inductor.

5. An accurately mechanically variable high reactivity power inductor as claimed in claim 4 wherein, in each inductor module, the upper and lower electrical windings are electrically interconnected in series and the connection between said windings is connected to the magnetic core, whereby the electric field strength between the electrical windings and the core is minimized, and whereby the magnetic cores stand at electrical potentials distributed along the vertical length of the inductor.

6. An accurately mechanically variable high reactivity power inductor as claimed in claim 5 wherein, in each inductor module, the electrical windings proceed convolutely outwardly, and wherein the inner ends of the windings are electrically connected to the magnetic core, and the outer ends of the windings of adjacent modules are electrically interconnected, whereby the electric field strength between windings and magnetic core is minimized.

7. An accurately mechanically variable high reactivity power inductor as claimed in claim 6 wherein the inner ends of the windings are electrically connected to the stationary core segment.

8. An accurately mechanically variable high reactivity power inductor as claimed in claim 4 wherein the feed screws engaging the movable core segments are also rotatably coupled to the stationary core segment and are formed of strong material of low magnetic permeability being disposed horizontally across the upper and lower gaps in a position to accept as an axial compressive load the electromagnetic attractive forces developed between the core segments.

9. An accurately mechanically variable high reactivity power inductor as claimed in claim 8 wherein the feed screws are disposed internally of the magnetic core segments in horizontal passages provided therein, and wherein the feed screws are coupled to the stationary core segment by thrust bearing means mounted in the horizontal passages and are engaged with the movable core segment by means mounted in the horizontal passages and engaging the screw threads on the feed screws, rotation of the feed screws thereby producing horizontal movement of the movable core segment to control the gap size between the separable core segments.

10. An accurately mechanically variable high reactivity power inductor as claimed in claim 9 wherein the thrust bearing means comprises a sleeve surrounding the feed screw and firmly secured to the stationary core segment, horizontally separated mounts secured in the sleeve, horizontally separated mounts secured to the feed screw, and opposed thrust bearings interposed between the sleeve mounts and feed screw mounts to maintain the sleeve and feed screw in fixed axial relation while allowing the feed screw to rotate.

11. An accurately mechanically variable high reactivity power inductor as claimed in claim 10 further comprising self-aligning sockets interposed between the sleeve and feed screw mounts adjacent the thrust bearings for maintaining the thrust retention forces parallel to the axis of the feed screw.

12. An accurately mechanically variable high reactivity power inductor as claimed in claim 10 wherein said sleeve is secured to the stationary core segment by bolts attached to the sleeve and extending to the exterior of the core segment.

13. An accurately mechanically variable high reactivity power inductor as claimed in claim 9 wherein the feed screw thread engaging means comprises a sleeve surrounding the feed screw and secured to the movable core segment, horizontally separated mounts secured in the sleeve, a nut secured to one mount for engaging the feed screw and translating rotation of the feed screw into horizontal movement of the movable core segment, and means secured to the other mount for radially confining the feed screw, whereby the movable core segment travels parallel to the feed screw.

14. An accurately mechanically variable high reactivity power inductor as claimed in claim 13 wherein the means radially confining the feed screw is a bearing.

15. An accurately mechanically variable high reactivity power inductor as claimed in claim 8 wherein the feed screws are supported at one end by the stationary core segment and at the other end by a vertical frame, and wherein the movable core segment is supported by the feed screws between their ends.

16. An accurately mechanically variable high reactivity power inductor as claimed in claim 15 further comprising a shaft rotatably mounted on the frame and extending to the exterior of the enclosure, and means rotatably linking the feed screws to the shaft, the ganged drive means being connected to the shaft of each module for simultaneous rotation thereof.

17. An accurately mechanically variable high reactivity power inductor as claimed in claim 15 further comprising a second vertical frame for supporting the electrical windings, and a third vertical frame for supporting the stationary core segment.

18. An accurately mechanically variable high reactivity power inductor as claimed in claim 4 wherein in each module the upper and lower electrical windings which bridge the upper and lower gaps between the separable core segments are offset, with the ends of the stationary core segment lying between the winding center and outer edge, whereby gap size may be increased while still maintaining effective fringing confinement with the electrical windings.

19. An accurately mechanically variable high reactivity power inductor as claimed in claim 18 wherein the ends of the stationary core segments lie approximately between one-fourth and one-half of the distance from the winding center to the winding outer edge.

20. An accurately mechanically variable high reactivity power inductor as claimed in claim 4 wherein, in each module, the enclosure around the magnetic core has bottom and top walls arranged for mating contact with the bottom and top walls of adjacent modules, and a side wall with an elongate cross-section, the longer dimension of the elongate cross-section being parallel to the plane of the magnetic core.

21. An accurately mechanically variable high reactivity power inductor as claimed in claim 4 further comprising, in each module, a reservoir for dielectric fluid located outside and above said enclosure and gravity feed means for connecting the reservoir to the interior of the enclosure, whereby the enclosure is maintained full of dielectric fluid.

22. An accurately mechanically variable high reactivity power inductor as claimed in claim 21 wherein each module further comprises a corona ring around the enclosure, and wherein the reservoir is within the corona ring.

23. An accurately mechanically variable high reactivity power inductor as claimed in claim 4, wherein, in each module, the enclosure around the magnetic core has flat bottom and top walls and a side wall with an oval cross-section, the long axis of the oval being parallel to the plane of the magnetic core, and wherein the stationary core segment is supported by a first vertical frame member secured between top and bottom enclosure walls, the electrical windings are supported by a second vertical frame member secured between top and bottom container walls, and the feed screws support the movable core segment and are in turn supported by a third vertical frame member secured between top and bottom container walls.

* * * * *